United States Patent
Kaufmann et al.

(10) Patent No.: US 7,640,229 B1
(45) Date of Patent: Dec. 29, 2009

(54) ROW TRIGGERS

(75) Inventors: Frederick S. Kaufmann, Irvine, CA (US); Grace Kwan-On Au, Rancho Palos Verdes, CA (US); Venkata Ramakrishna Tirunagari, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 1385 days.

(21) Appl. No.: 10/735,954

(22) Filed: Dec. 15, 2003

(51) Int. Cl.
*G06F 7/00* (2006.01)
*G06F 17/30* (2006.01)
*G06F 15/177* (2006.01)

(52) U.S. Cl. .................. 707/2; 707/1; 709/220
(58) Field of Classification Search .............. 707/2, 707/10, 100, 104.1, 1; 709/220
See application file for complete search history.

(56) References Cited

U.S. PATENT DOCUMENTS

| | | | | |
|---|---|---|---|---|
| 5,930,795 | A * | 7/1999 | Chen et al. | 707/100 |
| 6,122,633 | A * | 9/2000 | Leymann et al. | 707/10 |
| 6,374,236 | B1 * | 4/2002 | Chen et al. | 707/2 |
| 6,829,616 | B2 * | 12/2004 | Chen et al. | 707/102 |
| 7,516,208 | B1 * | 4/2009 | Kerrison et al. | 709/224 |
| 2002/0138497 | A1 * | 9/2002 | Chen et al. | 707/104.1 |
| 2004/0236763 | A1 * | 11/2004 | Krishnamoorthy et al. | 707/100 |
| 2005/0216520 | A1 * | 9/2005 | He et al. | 707/200 |

FOREIGN PATENT DOCUMENTS

EP 1111516 A2 * 6/2001

OTHER PUBLICATIONS

Transition tables, IBM UDB documentation, pp. 1-2.*
David DeWitt et al., Parallel Database Systems: The Future of High Performance Database Processing, Jun. 1992, pp. 1-26.*

* cited by examiner

*Primary Examiner*—Apu M Mofiz
*Assistant Examiner*—Brent Stace
(74) *Attorney, Agent, or Firm*—Howard Speight

(57) ABSTRACT

A method for processing a trigger are described. The trigger is associated with a subject table in a relational database and defines a triggering statement and one or more triggered actions. The method includes determining that a triggering statement of a trigger will execute on a subject table row of a subject table and requesting a transition table in response to determining that the triggering statement will execute. The transition table includes a transition table row. The transition table row includes a first value associated with the subject table row and a second value associated with the subject table row. The method further includes reading the transition table row from the transition table and identifying a processing unit to receive the transition table row and a triggered action of the trigger. The method also includes transmitting the transition table row and the triggered action to the identified processing unit to be processed.

26 Claims, 14 Drawing Sheets

|       |       |   |        |
|-------|-------|---|--------|
| 125x  | 21357 | 3 | 95000  |
| 125y  | 21391 | 7 | 85000  |
| 125z  | 21398 | 6 | 65000  |

FIG. 14a

|       |       |   |        |
|-------|-------|---|--------|
| 125x  |       |   |        |
| 125y  | 21391 | 7 | 85000  |
| 125z  | 21398 | 6 | 65000  |
| 125aa | 21357 | 3 | 125000 |

FIG. 14b

|       |       |   |        |
|-------|-------|---|--------|
| 125x  |       |   |        |
| 125y  | 21391 | 7 | 85000  |
| 125z  |       |   |        |
| 125aa | 21398 | 6 | 65000  |
| 125bb | 21357 | 3 | 125000 |

FIG. 14c

ROW TRIGGERS

BACKGROUND

A growing application for relational database systems is a data warehouse which stores a vast quantity of data concerning, for example, a company's ongoing operations in a collection of tables. In such data warehouse systems, changes made to an entry in a particular table within the database may require changes to other entries. For example, a change to a product price entry may necessitate changes to a projected revenue entry. One method of implementing such changes is through the use of triggers.

A trigger is a database object capable of executing specified triggered actions when a designated triggering statement occurs on a subject table with which the trigger is associated. Execution of the triggered action or actions, after the triggering action occurs, may additionally be contingent upon the satisfaction of certain conditions, or trigger conditions, within the trigger. For example, the trigger may be designed to insert a row into a second table if, after an update to a first table, a value in the first table exceeds a certain amount.

Existing systems utilize statement triggers, which are evaluated once for each triggering statement. In certain circumstances, triggering events may cause iterative processing of the trigger with individual rows triggering separate changes which may require explicit coding of the required changes. Additionally, where a large number of rows are affected by the triggering statement interaction between a parsing engine and processing modules may result in excessive traffic on the system.

SUMMARY

In general, in one aspect, the invention features a method for processing a trigger. The trigger is associated with a subject table in a relational database and defines a triggering statement and one or more triggered actions. The method includes determining that a triggering statement of a trigger will execute on a subject table row of a subject table and requesting a transition table in response to determining that the triggering statement will execute. The transition table includes a transition table row. The transition table row includes a first value associated with the subject table row and a second value associated with the subject table row. The method further includes reading the transition table row from the transition table and identifying a processing unit to receive the transition table row and a triggered action of the trigger. The method also includes transmitting the transition table row and the triggered action to the identified processing unit to be processed.

Implementations of the invention may include one or more of the following. The triggering statement may include one of an UPDATE, INSERT, INSERT/SELECT, and DELETE statement to be executed on the subject table. The triggered action may include a first triggered action of the trigger and a second triggered action of the trigger, and the method may include transmitting the transition table row by transmitting the transition table row, the first triggered action, and the second triggered action to the processing unit to be processed.

In general, in another aspect, the invention features a database system. The database system includes a massively parallel processing system including one or more nodes, a plurality of CPUs, a plurality of data storage facilities each of the one or more CPUs providing access to one or more data storage facilities; and a process for processing a trigger associated with a subject table in a relational database residing on the one or more data storage facilities The trigger defines a triggering statement and one or more triggered actions. Each of the one or more nodes providing access to one or more of the CPUs and each of the one or more CPUs provides access to one or more of the data storage facilities. The process includes determining that a triggering statement of a trigger will execute on a subject table row of a subject table, and requesting a transition table in response to determining that the triggering statement will execute. The transition table includes a transition table row, which includes a first value associated with the subject table row and a second value associated with the subject table row. The process also includes reading the transition table row from the transition table, identifying a processing unit to receive the transition table row and a triggered action of the trigger; and transmitting the transition table row and the triggered action to the identified processing unit to be processed.

Implementations of the invention may include one or more of the following. The triggering statement may include one of an UPDATE, INSERT, INSERT/SELECT, and DELETE statement to be executed on the subject table. The triggered action may include a first triggered action of the trigger and a second triggered action of the trigger, and the process may include transmitting the transition table row by transmitting the transition table row, the first triggered action, and the second triggered action to the processing unit to be processed.

BRIEF DESCRIPTION OF THE DRAWINGS

FIG. 14 shows a table during row trigger processing.

DETAILED DESCRIPTION

Figure 1:
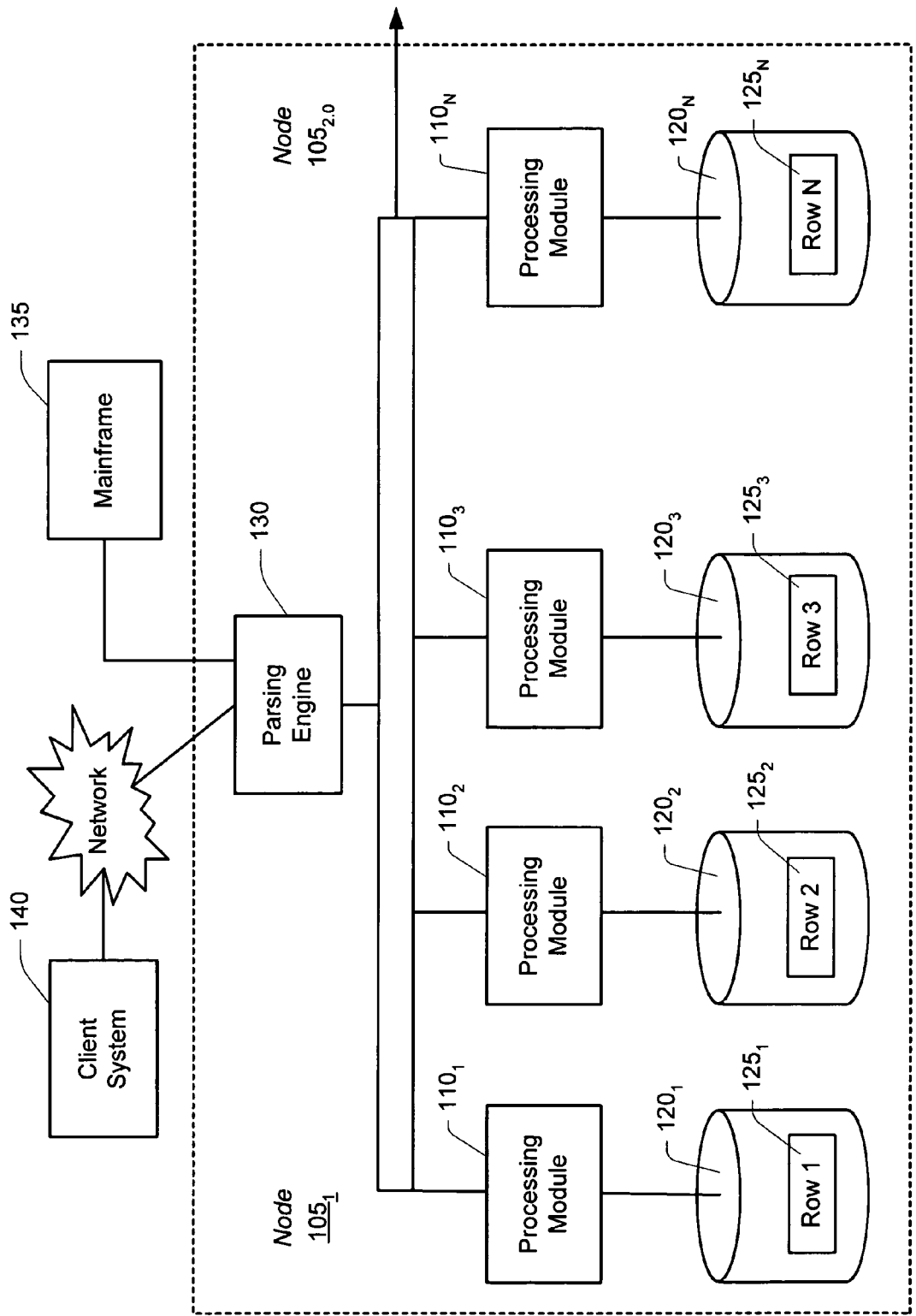
FIG. 1 is a block diagram of a node of a database system.

The trigger executing technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
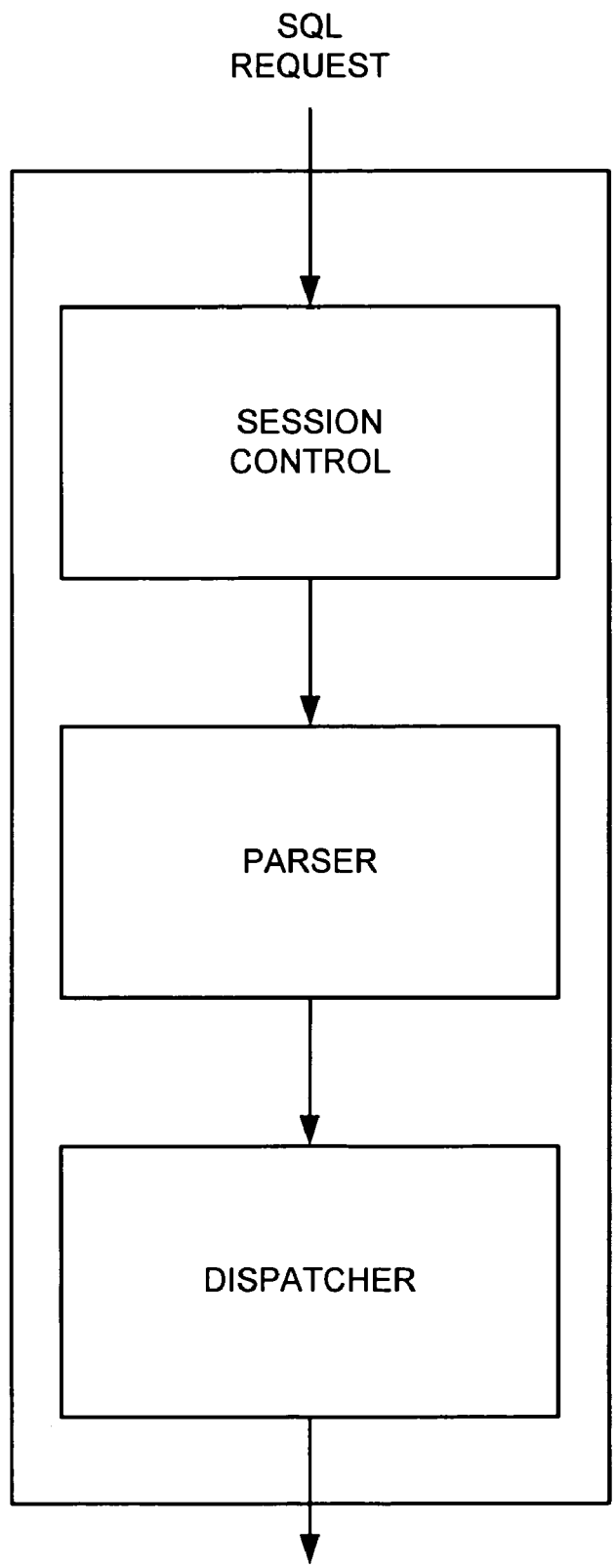
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
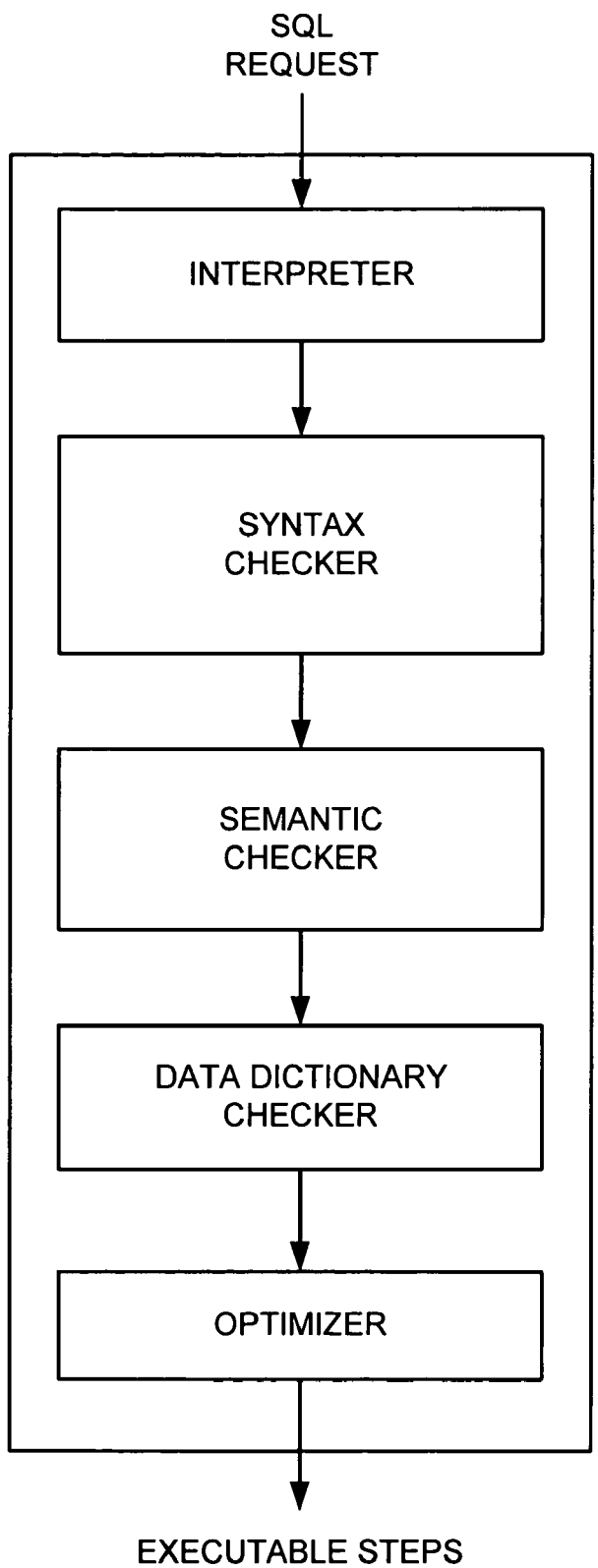
FIG. 3 is a block diagram of a parser.

Once the session control 200 allows a session to begin, a user may submit an SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
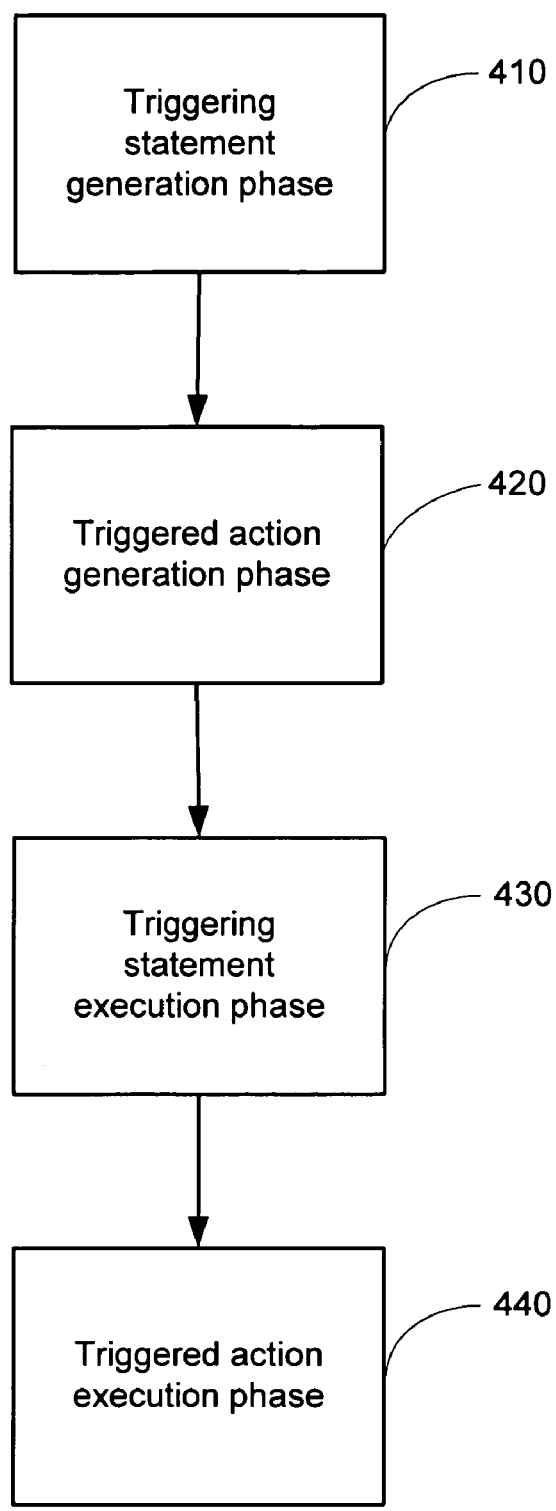
FIG. 4 is a flowchart of a method for processing a row trigger
Figure 5:
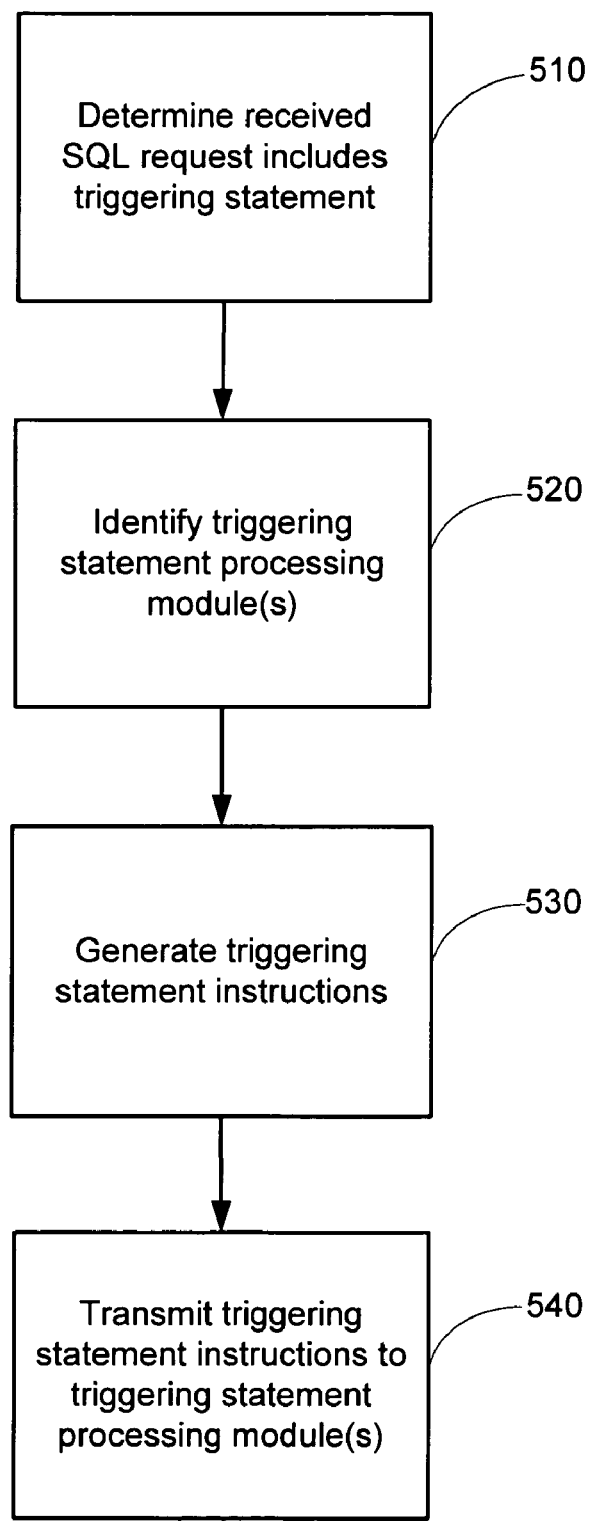
FIGS. 5-8 are flowcharts detailing a method for processing a row trigger.

A trigger processing technique includes four phases, as shown in FIG. 4: a triggering statement generation phase 410, a triggered action generation phase 420, a triggering statement execution phase 430, and a triggered action execution phase 440. The technique allows for execution of row triggers, which operate on rows serially. The technique provides scalability and flexibility in the processing of triggers.

FIGS. 5-8 illustrate one example of a system that performs the four phases illustrated in FIG. 4. The triggering statement generation phase (block 410), illustrated in more detail in FIG. 5, begins with parsing engine 130 determining that a received SQL request includes a triggering statement for a row trigger associated with a subject table stored on DBS 100 (block 510). Particular examples of DBS 100 may allow for different types of triggering statements. In a particular example of DBS 100, the triggering statement may represent an INSERT, INSERT/SELECT, UPDATE, or DELETE statement to be executed on the subject table.

After detecting the triggering statement, parsing engine 130 identifies a particular processing module or modules 110 (block 520) that manage a data-storage facility or facilities 120 containing rows of the subject table affected by the triggering statement, triggering statement processing module(s). For the sake of simplicity, this description will assume parsing engine 130 identifies only a single processing module 110 as the triggering statement processing module, in this case, triggering statement processing module $110_1$. For a particular row trigger, multiple data-storage facilities 120 may contain rows of the subject table that are affected by the triggering statement and, thus, parsing engine 130 identifies multiple triggering statement processing modules 110. In such a case, parsing engine 130 repeats the process described below for each data-storage facility 120 containing rows affected by the triggering statement, either sequentially or simultaneously.

Parsing engine 130 generates triggering statement instructions for the triggering statement processing module $110_1$ (block 530). The triggering statement instructions include the triggering statement and instruct triggering statement processing module $110_1$ to generate a transition table. Parsing engine 130 then transmits the triggering statement instructions to triggering statement processing module $110_1$ (block 540).

Figure 6:
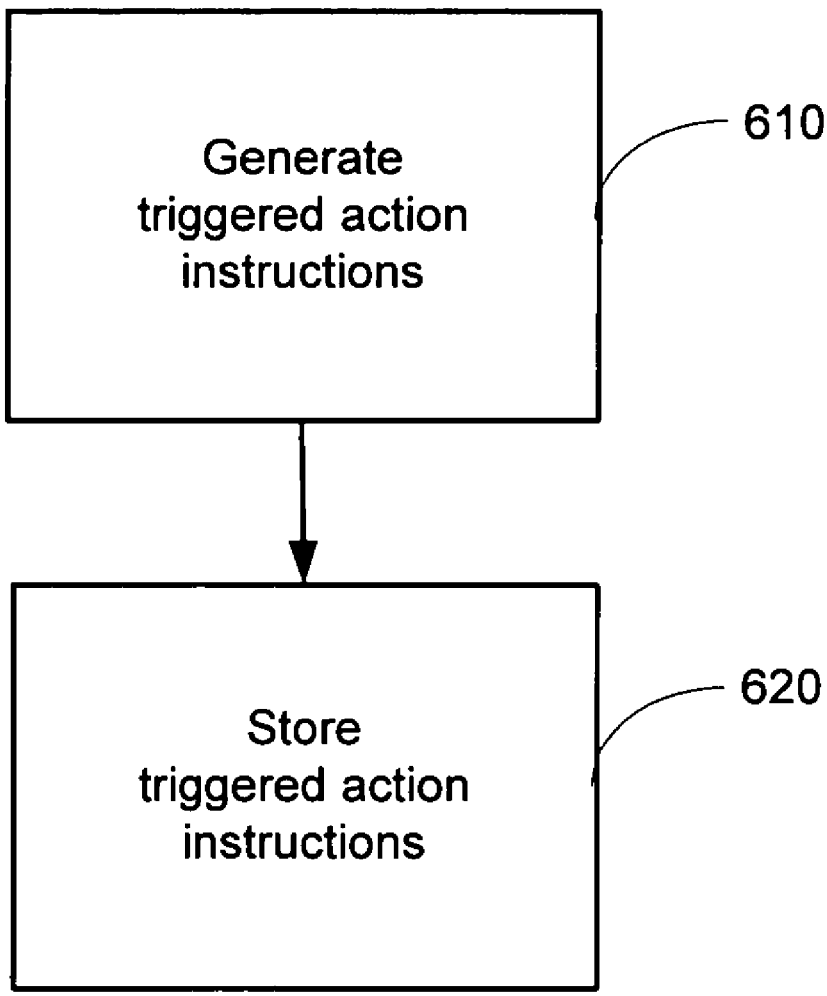

The triggered action generation phase (block 420), illustrated in greater detail in FIG. 6, begins with parsing engine 130 generating instructions (block 610) for the execution of the triggered actions, triggered action instructions. Values in the transition row may represent parameterized data in the triggered action instructions. Parsing engine 130 then stores (block 620) the triggered action instructions until the completion of the triggering statement processing phase (block 430). After the completion of triggering statement execution phase (block 430), parsing engine will receive a transition table including values associated with the affected rows. Parsing engine 130 will then incorporate values from the transition table into the triggered action instructions, as described in greater detail below. This may include substituting values from the transition table for parameterized data in the triggered action instructions.

Figure 7:
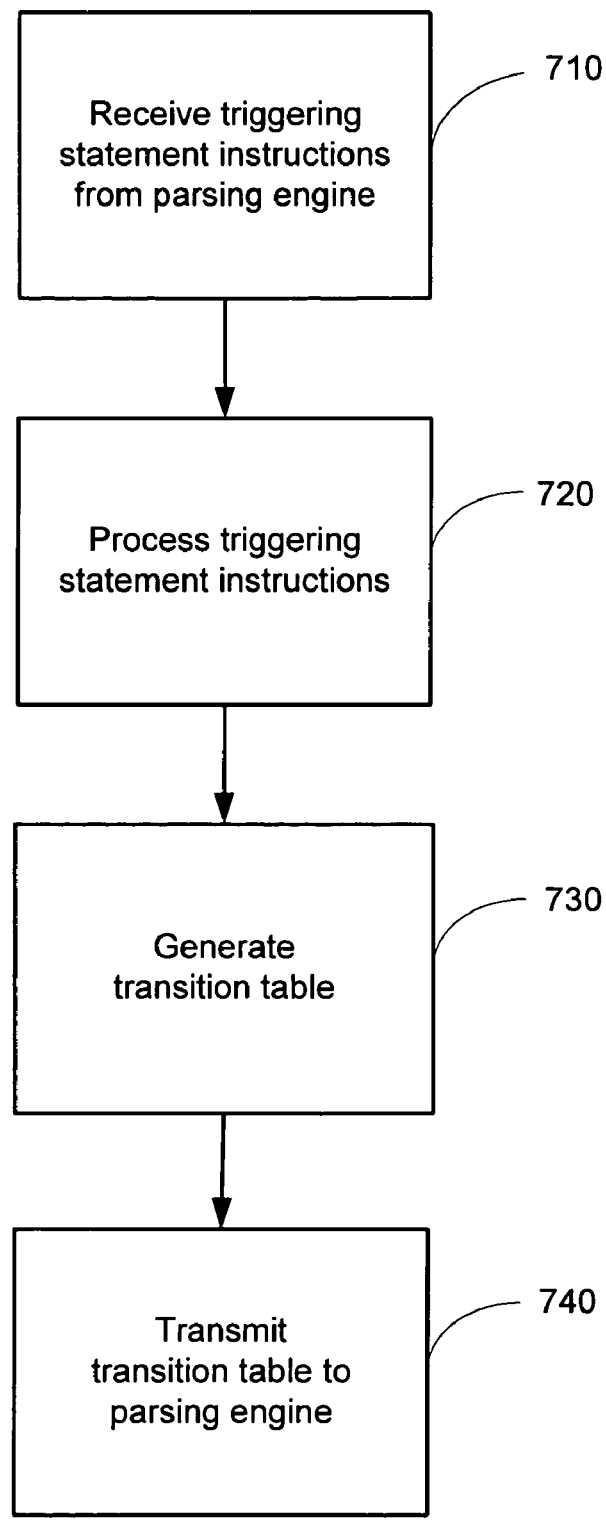

The triggering statement execution phase (block 430) for this example system, illustrated in FIG. 7, begins with triggering statement processing module $110_1$ receiving the triggering statement instructions from parsing engine 130 (block 710). Triggering statement processing module $110_1$ processes the triggering statement instructions (block 720). In processing the triggering statement instructions, triggering statement processing module $110_1$ executes the triggering statement on the appropriate rows 125. For example, for an UPDATE trigger, the triggering statement processing module 110 applies the UPDATE statements to the rows or tables designated by the triggering statement instructions.

Triggering statement processing module $110_1$ then generates a transition table (block 730). The transition table includes values associated with rows 125 affected by the triggering statement instructions. For example, the transition table may include the value of a particular row 125 before execution of the triggering statement and the value of the same row 125 after execution of the triggering statement. In general, transition table may include any values appropriate for processing the trigger. After generating the transition table, triggering statement processing module $110_1$ then transmits the transition table to parsing engine 130 (block 740).

Figure 8:
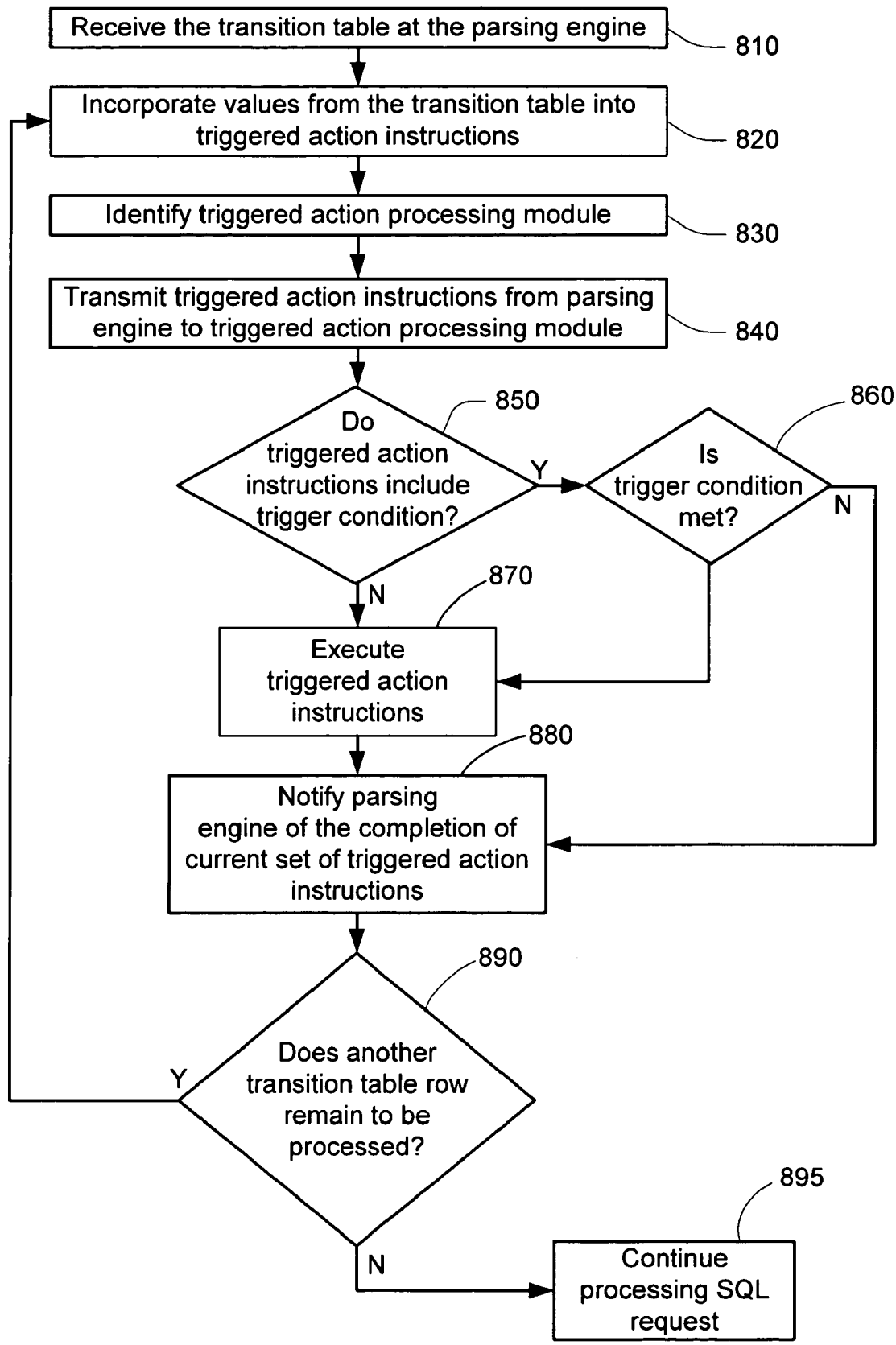

The triggered action execution phase (block 440), illustrated in greater detail in FIG. 8, begins with parsing engine 130 receiving the transition table from triggering statement processing module $110_1$ (block 810). Upon receiving the transition table, parsing engine 130 incorporates values (block 820) from a first row of the transition table into the triggered action instructions to create a first set of triggered action instructions. For example, a trigger might be designed to archive old values of updated rows in the subject table. In this case, after an UPDATE initiates the trigger, parsing engine 130 incorporates the old values of affected rows 125, as stored in the transition table, into the triggered action instructions to implement the archiving.

Parsing engine 130 then identifies a particular processing module 110 (block 830) that manages a data-storage facility 120 containing rows of a table affected by the first set of triggered action instructions, a triggered action processing module. For the sake of simplicity, this description will assume parsing engine 130 identifies processing module $110_N$ as the triggered action processing module for the first set of triggered action instruction, i.e. as triggered action processing module $110_N$. Parsing engine 130 then transmits the first set of triggered action instructions to triggered action processing module $110_N$ (block 840).

Triggered action processing module $110_N$ next determines whether the first set of triggered action instructions includes a trigger condition (block 850). If the first set does contain a trigger condition, triggered action processing module determines whether the condition is met (block 860). Returning to the archive example, the trigger might be designed to log an old transition row only if the old price entry is greater than some predetermined minimum. In this case, the trigger condition would be whether the price in the old transition row was greater than the minimum. If the trigger condition is satisfied or if there is no trigger condition, triggered action processing module $110_N$ executes the first set of triggered action instructions (block 870).

After triggered action processing module $110_N$ executes the first set of triggered action instructions or determines that the trigger condition is not satisfied, triggered action processing module $110_N$ communicates completion of the first set of triggered action instructions to parsing engine 130. (block 880). Parsing engine 130 then determines whether another row of the transition table remains to be processed (block 890). If another row remains to be processed, parsing engine 130 and processing modules 110 repeat the process (blocks 820-890) for the remaining rows of the transition table until all rows of the transition table have been processed. Depending on the configuration of database system 100, multiple data-storage facilities 120 may hold rows affected by the triggered action statements, and parsing engine 130 may transmit triggered action instructions to multiple processing modules 110 in the course of completing triggered action execution phase (block 440). If no transition table row remains to be processed, parsing engine 130 executes the remainder of the SQL request (block 895).

An alternative example of the trigger processing system is illustrated in FIGS. 9-12. The alternative implementation provides for transmission of the transition table directly from triggering statement processing module $110_1$ to triggered action processing module $110_N$. This implementation may provide for more efficient row trigger processing in certain circumstances.

Figure 9:
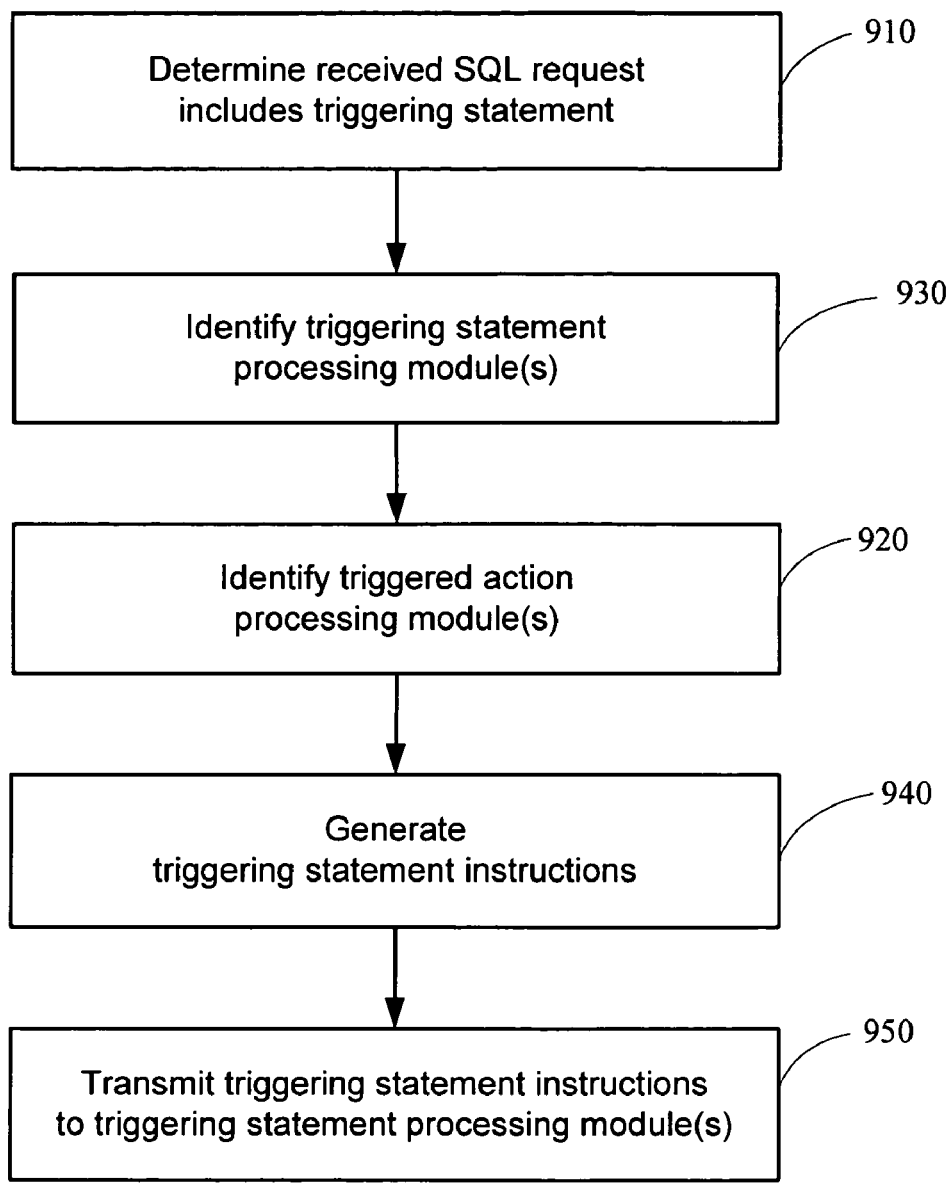
FIGS. 9-12 are flowcharts detailing a method for processing a row trigger.

The triggering statement generation phase (block 410) according to this example system, illustrated in more detail in FIG. 9, begins with parsing engine 130 determining that a received SQL request includes a triggering statement for a row trigger associated with a subject table in the database (block 910). After detecting the triggering statement, parsing engine 130 identifies triggering statement processing module $110_1$ (block 920) as described above. Parsing engine 130 also identifies various processing modules 110 (block 930), triggered action processing modules, that manage data-storage facilities 120 containing rows affected by the triggered actions associated with the row trigger. For illustrative purposes, multiple processing modules, specifically all of processing modules $110_{2...N}$, will be assumed to hold a row or rows affected by the triggered actions.

Parsing engine 130 generates triggering statement instructions for the triggering statement processing module $110_1$ (block 940). The triggering statement instructions include the triggering statement to be executed and instruct triggering statement processing module $110_1$ to generate a transition table. In this example system, the triggering statement instructions also identify triggered action processing modules $110_{2...N}$. Parsing engine 130 transmits the triggering statement instructions to triggering statement processing module $110_1$ (block 950).

Figure 10:
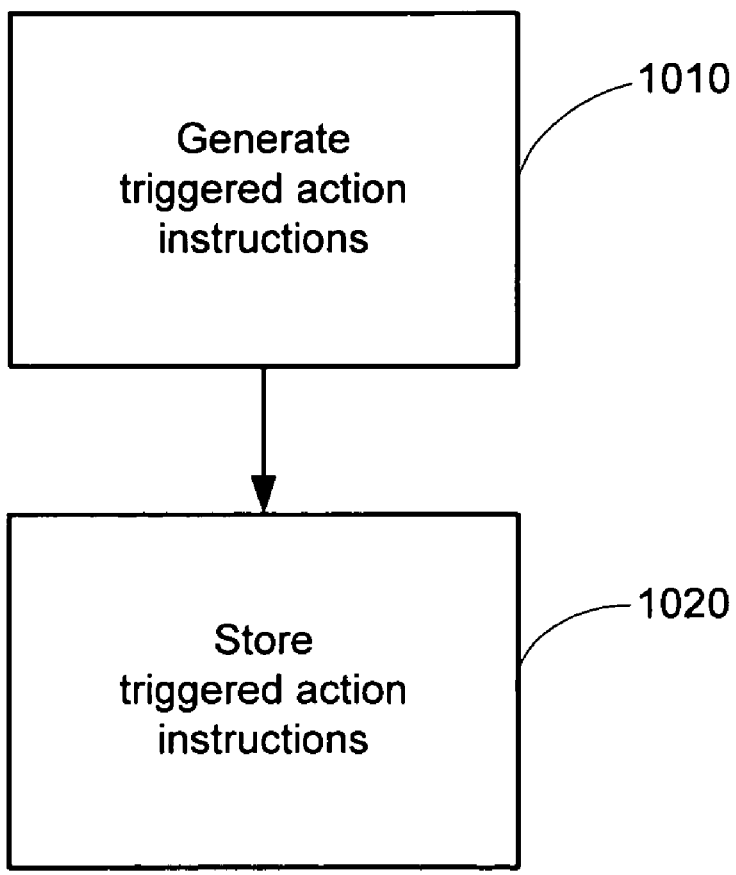

The triggered action generation phase (block 420) for this example system, illustrated in more detail in FIG. 10, begins with parsing engine 130 generating triggered action instructions (block 1010) to execute the triggered actions of the trigger. The triggered action instructions in this example system instruct each triggered action processing modules $110_{2...N}$ how to process the portions of the transition table which that particular triggered action processing modules $110_{2...N}$ will receive during the triggering statement execution phase (block 430). For example, for triggered action processing module $110_N$ the triggered action instructions may identify a specific location within data storage facility $120_N$ where triggered action processing module $110_N$ is configured to store transition tables received from triggering statement processing module $110_1$. As another example, triggered action instructions may reference values by their location within the transition table, and triggered action processing module $110_N$ may be responsible for identifying, during the triggered statement execution phase (block 440), the location where the transition table is stored. After generating the triggered action instructions, parsing engine 130 then stores the triggered action instructions (block 1020) until the completion of the triggering statement execution phase (block 430), as described in greater detail below.

Figure 11:
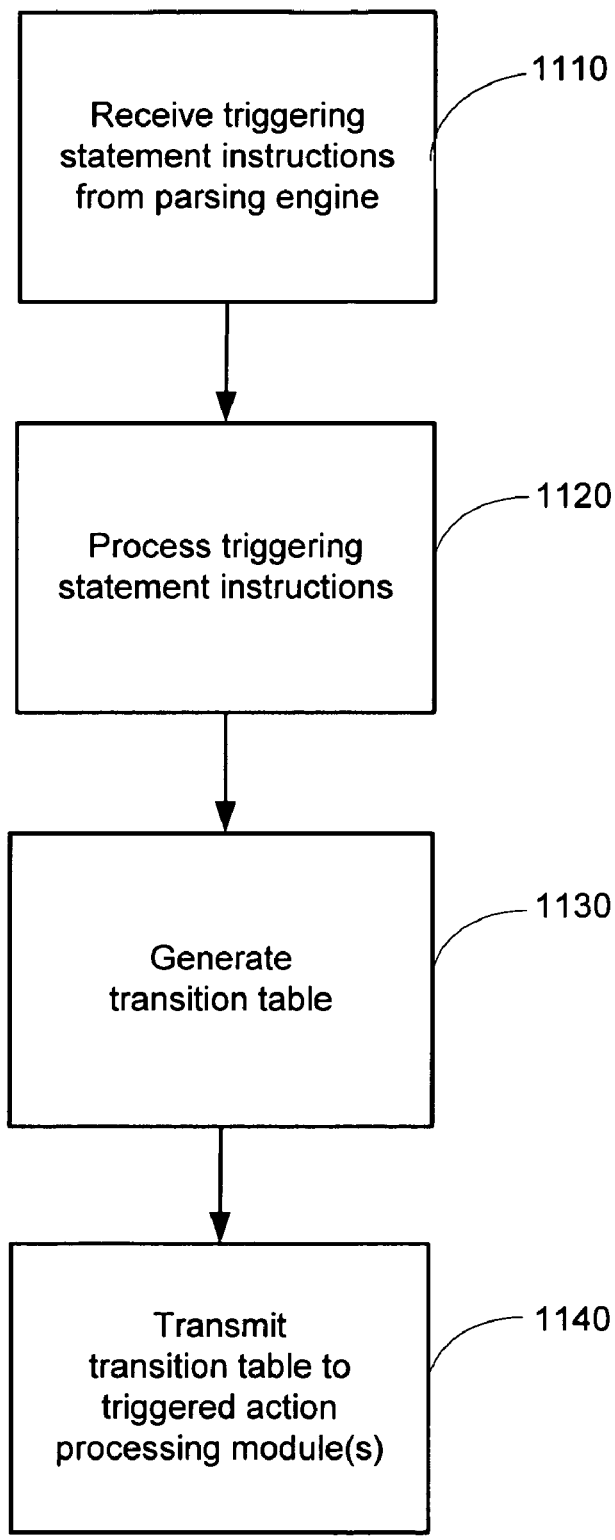

The triggering statement execution phase (block 430) for this example system, illustrated in more detail in FIG. 11, begins with triggering statement processing module $110_1$ receiving the triggering statement instructions from parsing engine 130 (block 1110). Triggering statement processing module $110_1$ processes the triggering statement instructions (block 1120). In processing the triggering statement instructions, triggering statement processing module $110_1$ executes the triggering statement on the appropriate rows $125_{1...N}$. Triggering statement processing module $110_1$ then generates a transition table (block 1130). Triggering statement processing module $110_1$ then transmits each row of the transition table to a triggered action processing module $110_{2...N}$ as identified by the triggering statement instructions (block 1140).

Figure 12:
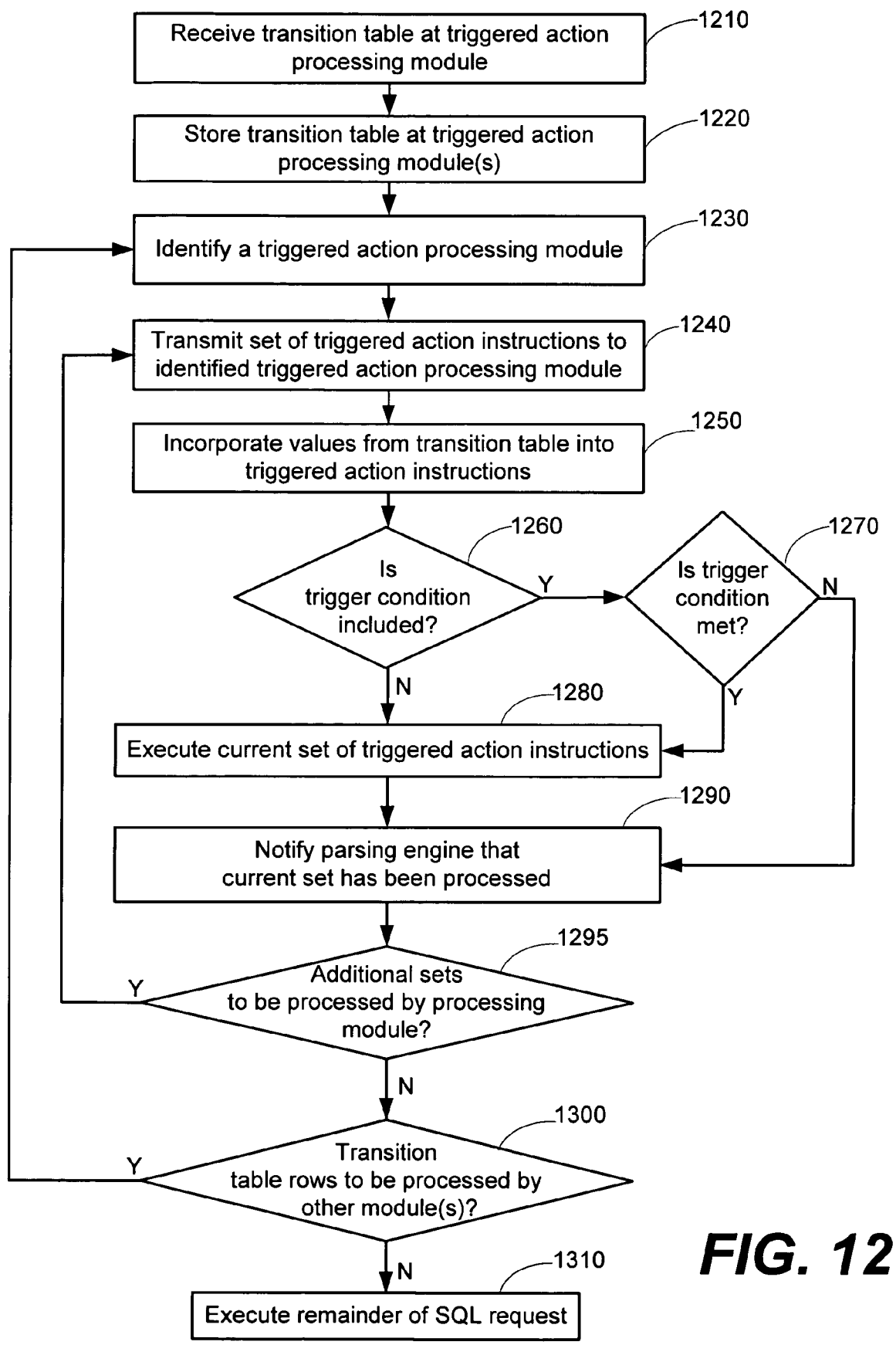

The triggered action execution phase (block 440) for this example system, illustrated in more detail in FIG. 12, begins with triggered action processing modules $110_{2...N}$ receiving rows of the transition table from triggering statement processing module $110_1$ (block 1210). Each triggered action processing module $110_{2...N}$ stores the transition table rows received by that triggered action processing module (block 1220). Parsing engine then identifies a first triggered action processing module (block 1230), for the purposes of this example, triggered action processing module $110_N$. Parsing engine transmits a first set of triggered action instructions to the first triggered action processing module $110_N$ (block 1240), instructing triggered action processing module $110_N$ to process the first set using the first row in the portion of the transition table received by triggered action processing module $110_N$.

Once triggered action processing module $110_N$ has received the first set of triggered action instructions, triggered action processing module $110_N$ incorporates values from the first transition table row into the triggered action instructions (block 1250). Parsing engine 130 may instruct triggered action processing module $110_N$ as to the location of the transition table row associated with that particular set of triggered action instructions. The triggered action instructions may identify the location of the stored transition table or triggered processing module 110 may determine the location in another appropriate manner. Triggered action processing module $110_N$ then determines whether the triggered action instructions include a trigger condition (block 1260). If the triggered action instructions contain a trigger condition, triggered action processing module $110_N$ determines whether the trigger condition is met (block 1270).

If the trigger condition is satisfied or if there is no trigger condition, triggered action processing module $110_N$ executes the first set of triggered action instructions (block 1280). The triggered action instructions may include references to the values of the associated transition table row. For example, the triggered action instructions may instruct triggered action processing module $110_N$ to insert a row in the archive table that includes the previous price of a product that was updated during the triggering statement processing phase. When processing this instruction, triggered action processing module $110_N$ reads the previous price from the transition table row and inserts a new row in the archive table that includes the previous price.

Once triggered action processing module $110_N$ executes the action or determines that the trigger condition is not satisfied, triggered action processing module $110_N$ notifies parsing engine 130 that triggered action processing module $110_N$ has finished processing the first set of triggered action instructions (block 1290). Additionally, if additional sets of transition table rows remain to be processed in the portion of the transition table received by triggered action processing module $110_N$, triggered action processing module $110_N$ may also communicate to parsing engine 130 the location of the next remaining transition table row received by triggered action processing module $110_N$. Otherwise, triggered action processing module $110_N$ may indicate to parsing engine 130 that triggered action processing module $110_N$ has no stored transition table rows remaining to be processed.

If additional rows remain to be processed for processing module $110_N$ (block 1295), parsing engine 130 and processing modules 110 repeat the process (blocks 1240-1295) for the remaining sets of triggered action instructions. If not, parsing engine 130 determines if other triggered action processing modules 120 still must process transition table rows (block 1300). If so, parsing engine 130 repeats the process (1230-1300) for the remaining triggered action processing modules 110, one at a time. When no transition table rows remain to be processed on any triggered action processing modules 110, parsing engine 130 executes the remainder of the SQL request (block 1310).

This alternative system may provide more efficient trigger processing in certain circumstances. By eliminating transmission of the transition table from triggering statement processing module $110_1$ to parsing engine 130 and from parsing engine 130 to triggered action processing module $110_N$, this example system may reduce the time and network resources needed to process the row trigger. This example system may also allow for increased scalability as the transition table does not need to be returned to parsing engine 130 for processing, which may lead to bottlenecks when multiple row triggers are processing simultaneously.

Figure 13:
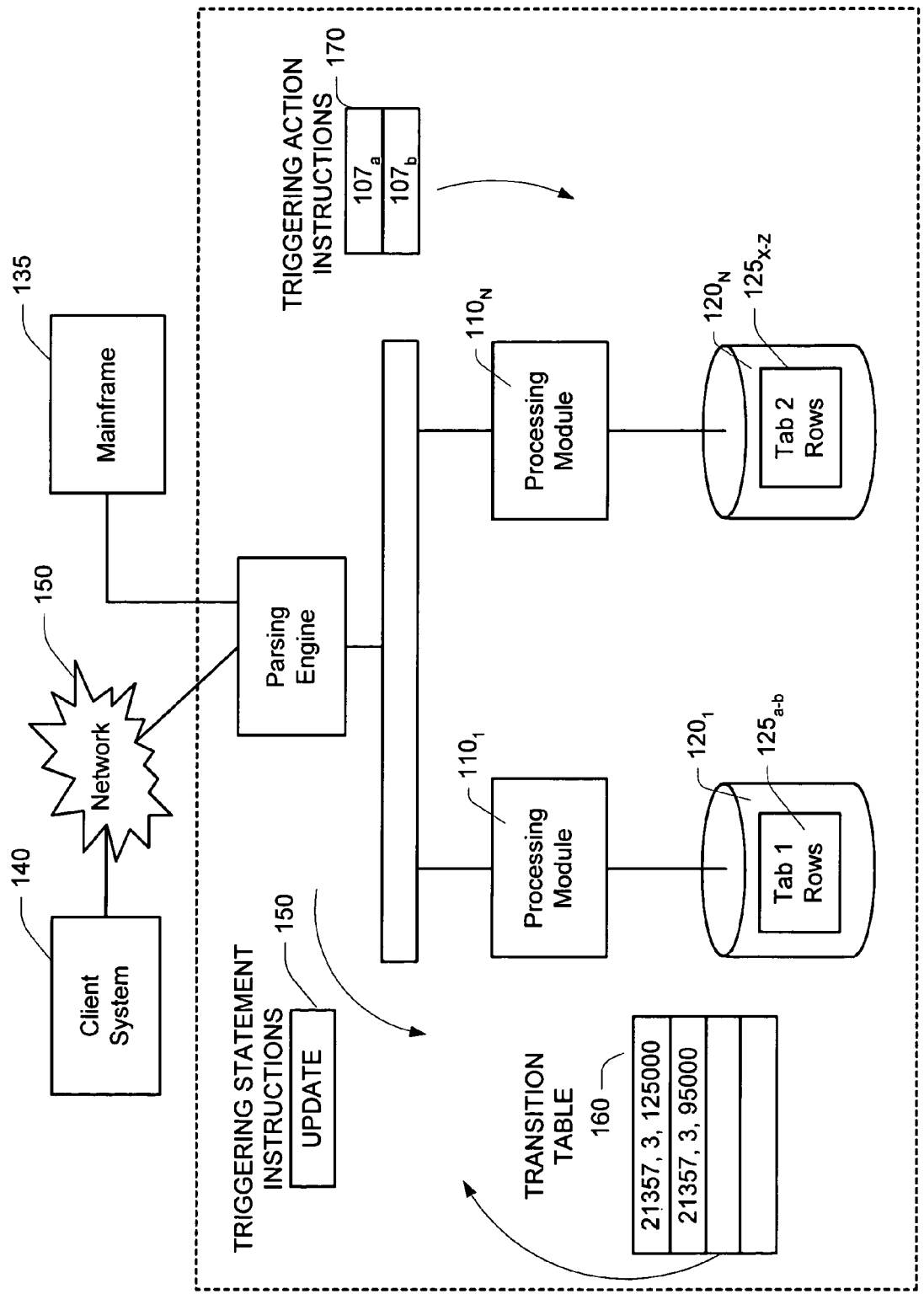
FIG. 13 illustrates a system processing a row trigger.

FIG. 13 illustrates operation of one example system according to the first example system discussed above with respect to FIGS. 5-8. For the purposes of this example, a trigger and subject tables are defined as:

CREATE TABLE Tab1 (Emp_ID1 INT, Section1 INT, Salary1 INT);
CREATE TABLE Tab2 (Emp_ID2 INT, Section2 INT, Salary2 INT);
CREATE TRIGGER Trig1 AFTER UPDATE ON Tab1
REFERENCING NEW AS NEWROW OLD AS OLDROW
FOR EACH ROW
(
DELETE FROM Tab2 WHERE Emp_ID2=OLDROW.Emp_ID1;
INSERT INTO Tab2 (NEWROW.Emp_ID1, NEWROW.Section1, NEWROW.Salary1);
)

Based on this definition, when a row in "Tab1" is updated, the example system will determine whether a row exists in "Tab2" that contains the same value for "Emp_ID". If so, the example system will delete the row in "Tab2" and replace the row with an updated version of the row from "Tab1."

In this example, parsing engine 130 receives an SQL request 145 that includes an "UPDATE" statement. Parsing engine 130 then determines the "UPDATE" statement is a triggering statement for the row trigger "TRIGGER" which, for the purposes of this example, affects rows 125*a* and 125*b* stored on data storage facility $120_1$. As a result, parsing engine 130 identifies triggering statement processing module $110_1$ based on its association with storage facility $120_1$.

Parsing engine 130 generates triggering statement instructions 150 that include an "UPDATE" instruction for each of rows 125*a* and 125*b* and generates triggered action instructions 170. Parsing engine 130 then transmits triggering statement instructions 150 to triggering statement processing module $110_1$. Triggering statement processing module 110 updates rows 125*a* and 125*b*. Triggering statement processing module $110_1$ also generates transition table 160. Transition table 160 includes transition table rows 165*a* and 165, which contain both the old and new values of rows 125*a* and 125*b*, respectively. Triggering statement processing module 110, then transmits transition table 160 to parsing engine 130.

Parsing engine 130 receives transition table 160 from triggering statement processing module $110_1$. Parsing engine 130 incorporates the values in transition table 160 into a set of triggered action instructions 170. Specifically, parsing engine 130 incorporates the values in transition table rows 165*a* and 165*b* into a first set 170*a* and a second set 170*b* of triggered action instructions:

DELETE FROM Tab2 WHERE Emp_ID2="21357";
INSERT INTO Tab2 ("21357", "3", "125000");

and:
DELETE FROM Tab2 WHERE Emp_ID2="21398";
INSERT INTO Tab2 ("21398", "6", "75000");

Parsing engine 130 then identifies a processing module or modules 110 corresponding to a data-storage facility or facilities 120 that stores rows of "Tab 2" associated with first set 170*a*, in this case, triggered action processing module $110_N$.

Parsing engine 130 transmits triggered action instructions 170a to triggered action processing module(s) 110$_N$.

FIGS. 14a-c illustrate the contents of specific rows in "Tab2" during processing of triggered action instructions 170a and 170b. After receiving first set 170a of triggered action instructions, triggered action processing module 110$_N$ begins processing first set 170a, as shown in FIG. 14a. Triggered action processing module 110$_N$ determines that the trigger condition of triggered action instruction 170a is satisfied by row 125x. Thus, triggered action processing module 110$_N$ executes first set 170a, deleting row 125x and adding row 125aa, as shown in FIG. 14b.

After processing first set 170a, triggered action processing module 110$_N$ notifies parsing engine 130 that triggered action processing module 110$_N$ has completed executing first set 170a. Parsing engine 130 then identifies a processing module or modules 110 corresponding to a data-storage facility or facilities 120 that stores rows of "Tab 2" associated with second set 170b, in this case also, triggered action processing module 110$_N$. Parsing engine 130 transmits triggered action instructions 170b to triggered action processing module(s) 110$_N$.

Triggered action processing module 110$_N$ then begins processing second set 170b. Triggered action processing module 110$_N$ determines that the trigger condition of second set 170b is satisfied by row 125z. Thus, triggered action processing module 110$_N$ executes second set 170b, deleting row 125z and adding row 12bb, as shown in FIG. 14c. Triggered action processing module 110$_N$ then notifies parsing engine 130 that triggered action processing module 110$_N$ has completed executing second set 170b. Parsing engine 130 then returns to executing SQL request 145.

The text above describes one or more specific embodiments of a broader invention. The invention also is carried out in a variety of alternate embodiments and thus is not limited to those described here. For example, as mentioned above, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto

What is claimed is:

1. A method for processing a trigger associated with a subject table in a relational database, wherein the trigger defines a triggering statement and one or more triggered actions, the method including:
   determining that a triggering statement of a trigger will execute on a subject table row of a subject table;
   requesting a transition table in response to determining that the triggering statement will execute, the transition table including a transition table row, wherein the transition table row comprises at least one value associated with the subject table row;
   reading the transition table row from the transition table;
   identifying a processing unit to receive the transition table row and a triggered action of the trigger based on an association between the identified processing unit and a portion of memory; and
   transmitting the transition table row and the triggered action to the identified processing unit to be processed.

2. The method of claim 1, wherein the triggering statement comprises one of an UPDATE, INSERT, INSERT/SELECT, and DELETE statement to be executed on the subject table.

3. The method of claim 1, wherein the triggered action comprises a first triggered action of the trigger and a second triggered action of the trigger, and transmitting the transition table row comprises transmitting the transition table row, the first triggered action, and the second triggered action to the processing unit to be processed.

4. A method for processing a trigger associated with a subject table in a relational database, wherein the trigger defines a triggering statement and one or more triggered actions, the method including:
   determining that a triggering statement of a trigger will execute on a subject table row of a subject table;
   instructing a first processing unit, in response to determining that the triggering statement of the trigger will execute, to communicate a transition table row to a second processing unit, wherein the transition table row comprises at least one value associated with the subject table row;
   transmitting a triggered action of the trigger to the second processing unit to be processed using the transition table row.

5. The method of claim 4, wherein the triggering statement comprises one of an UPDATE, INSERT, INSERT/SELECT, and DELETE statement to be executed on the subject table.

6. The method of claim 4, further comprising:
   instructing the first processing unit, in response to determining that the triggering statement of the trigger will execute, to communicate a second transition table row to a third processing unit, wherein the second transition table row comprises the at least one value associated with the subject table row; and
   transmitting a second triggered action of the trigger to the third processing unit to be processed using the second transition table row.

7. A method for processing a trigger associated with a subject table in a database comprising:
   receiving a triggering statement of a trigger to be executed on a subject table row of a subject table and information identifying a processing unit;
   generating a transition table row in response to receiving the triggering statement, wherein the transition table row comprises at least one value associated with the subject table row;
   transmitting the transition table row to the processing unit.

8. The method of claim 7, wherein generating a transition table row comprises:
   determining the original value of the subject table row;
   applying the triggering statement to the subject table row;
   determining the new value of the subject table row; and
   generating a transition table row, wherein the transition table row comprises the original value and the new value.

9. A method for processing a trigger associated with a subject table in a database comprising:
   receiving a transition table row, wherein the transition table row comprises at least one value associated with the subject table row;
   storing the transition table row in a memory;
   receiving a triggered action of a trigger associated with a subject table and information identifying the transition table row;
   reading the transition table row from the memory based on the information identifying the transition table row; and processing the triggered action based on the transition table row.

10. The method of claim 9, wherein processing the triggered action comprises:
   determining whether the transition table row satisfies a trigger condition of the trigger; and
   processing the triggered action if the transition table row satisfies the trigger condition.

11. A computer program, stored on a tangible storage medium, for use in processing a trigger associated with a subject table in a relational database, the program including executable instructions that cause a computer to:
   determine that a triggering statement of a trigger will execute on a subject table row of a subject table;
   request a transition table in response to determining that the triggering statement will execute, the transition table including a transition table row, the transition table row comprising at least one value associated with the subject table row;
   read the transition table row from the transition table;
   identify a processing unit to receive the transition table row and a triggered action of the trigger based on an association between the identified processing unit and a portion of memory; and
   transmit the transition table row and the triggered action to the identified processing unit to be processed.

12. The computer program of claim 11, wherein the triggering statement comprises one of an UPDATE, INSERT, INSERT/SELECT, and DELETE statement to be executed on the subject table.

13. The computer program of claim 11, wherein the triggered action comprises a first triggered action of the trigger and a second triggered action of the trigger, and wherein the program causes the computer to transmit the transition table row by transmitting the transition table row, the first triggered action, and the second triggered action to the processing unit to be processed.

14. A computer program, stored on a tangible storage medium, for use in processing a trigger associated with a subject table in a relational database, the program including executable instructions that cause a computer to:
   determine that a triggering statement of a trigger will execute on a subject table row of a subject table;
   instruct a first processing unit, in response to determining that the triggering statement of the trigger will execute, to communicate a transition table row to a second processing unit, wherein the transition table row comprises at least one value associated with the subject table row; and
   transmit a triggered action of the trigger to the second processing unit to be processed using the transition table row.

15. The computer program of claim 14, wherein the triggering statement comprises one of an UPDATE, INSERT, INSERT/SELECT, and DELETE statement to be executed on the subject table.

16. The computer program of claim 14, further including executable instructions that cause a computer to
   instruct the first processing unit, in response to determining that the triggering statement of the trigger will execute, to communicate a second transition table row to a third processing unit, wherein the transition table row comprises a first value associated with the subject table row and a second value associated with the subject table row; and
   transmit a second triggered action of the trigger to the third processing unit to be processed using the second transition table row.

17. A computer program, stored on a tangible storage medium, for use in processing a trigger associated with a subject table in a relational database, the program including executable instructions that cause a computer to:
   receive a triggering statement of a trigger to be executed on a subject table row of a subject table and information identifying a processing unit;
   generate a transition table row in response to receiving the triggering statement, wherein the transition table row comprises at least one value associated with the subject table row; and
   transmit the transition table row to the processing unit.

18. The computer program of claim 17, wherein the executable instructions cause the computer to generate the transition table row by:
   determining the original value of the subject table row;
   applying the triggering statement to the subject table row;
   determining the new value of the subject table row; and
   generating a transition table row, wherein the transition table row comprises the original value and the new value.

19. A computer program, stored on a tangible storage medium, for use in processing a trigger associated with a subject table in a relational database, the program including executable instructions that cause a computer to:
   receive a transition table row, wherein the transition table row comprises at least one value associated with the subject table row;
   store the transition table row in a memory;
   receive a triggered action of a trigger associated with a subject table and information identifying the transition table row;
   read the transition table row from the memory based on the information identifying the transition table row; and
   process the triggered action based on the transition table row.

20. The computer program of claim 19, wherein the executable instructions cause the computer to process the triggered action by:
   determining whether the transition table row satisfies a trigger condition of the trigger; and
   processing the triggered action if the transition table row satisfies the trigger condition.

21. A database system including:
   a massively parallel processing system including:
      one or more nodes;
      a plurality of CPUs, each of the one or more nodes providing access to one or more CPUs;
      a plurality of data storage facilities each of the one or more CPUs providing access to one or more data storage facilities; and
      a process for processing a trigger associated with a subject table in a relational database residing on the one or more data storage facilities, wherein the trigger defines a triggering statement and one or more triggered actions, the process including:
         determining that a triggering statement of a trigger will execute on a subject table row of a subject table;
         requesting a transition table in response to determining that the triggering statement will execute, the transition table including a transition table row, wherein the transition table row comprises at least one value associated with the subject table row;

reading the transition table row from the transition table;

identifying a CPU to receive the transition table row and a triggered action of the trigger based on a data storage facility to which the identified CPU provides access; and transmitting the transition table row and the triggered action to the identified CPU to be processed.

22. The database system of claim 21, wherein the triggering statement comprises one of an UPDATE, INSERT, INSERT/SELECT, and DELETE statement to be executed on the subject table.

23. The database system of claim 21, wherein the triggered action comprises a first triggered action and a second triggered action of the trigger, and transmitting the transition table row comprises transmitting the transition table row, the first triggered action, and the second triggered action to the identified CPU to be processed.

24. The method of claim 1 wherein identifying the processing unit to receive the transition table row and the triggered action comprises identifying the processing unit to receive the transition table row and the triggered action based on an association between the identified processing unit and a portion of memory storing a row of the subject table that is affected by the triggering statement.

25. The computer program of claim 11, wherein the executable instructions further cause the computer to identify the processing unit to receive the transition table row and the triggered action by identifying the processing unit to receive the transition table row and the triggered action based on an association between the identified processing unit and a portion of memory storing a row of the subject table that is affected by the triggering statement.

26. The database system of claim 21, wherein the process is further operable to identify the CPU to receive the transition table row and the triggered action by identifying a CPU that provides access to a data storage facility storing a row of the subject table that is affected by the triggering statement.

* * * * *